United States Patent
Singaraju et al.

(10) Patent No.: US 11,961,317 B2
(45) Date of Patent: Apr. 16, 2024

(54) EXTRACTING TEXTUAL INFORMATION FROM IMAGE DOCUMENTS

(71) Applicant: Oracle Financial Services Software Limited, Mumbai (IN)

(72) Inventors: Dakshayani Singaraju, Tirupati (IN); Veresh Jain, Bangalore (IN); Kartik Kumar, New Delhi (IN)

(73) Assignee: Oracle Financial Services Software Limited, Maharashtra (IN)

( * ) Notice: Subject to any disclaimer, the term of this patent is extended or adjusted under 35 U.S.C. 154(b) by 0 days.

(21) Appl. No.: 17/650,530

(22) Filed: Feb. 10, 2022

(65) Prior Publication Data
US 2023/0162516 A1 May 25, 2023

(30) Foreign Application Priority Data
Nov. 24, 2021 (IN) .............................. 202121054248

(51) Int. Cl.
*G06V 30/18* (2022.01)
*G06V 30/16* (2022.01)
*G06V 30/41* (2022.01)

(52) U.S. Cl.
CPC .............. *G06V 30/18* (2022.01); *G06V 30/16* (2022.01); *G06V 30/41* (2022.01)

(58) Field of Classification Search
CPC ............................................... G06V 30/00–43
See application file for complete search history.

(56) References Cited

U.S. PATENT DOCUMENTS

| | | | |
|---|---|---|---|
| 5,805,747 A * | 9/1998 | Bradford | G06F 18/254 382/185 |
| 7,697,758 B2 | 4/2010 | Vincent | |
| 9,262,689 B1 * | 2/2016 | Sikka | G06V 20/62 |
| 2002/0051575 A1 * | 5/2002 | Myers | G06V 20/63 382/202 |
| 2003/0161523 A1 * | 8/2003 | Moon | G06F 18/256 382/139 |
| 2005/0180632 A1 * | 8/2005 | Aradhye | G06V 20/63 382/182 |
| 2006/0067593 A1 * | 3/2006 | Erol | H04N 19/162 375/E7.172 |

(Continued)

FOREIGN PATENT DOCUMENTS

JP 11282964 A * 10/1999

OTHER PUBLICATIONS

International Search Report and Written Opinion for International Patent Application No. PCT/IB2022/060914, dated Feb. 13, 2023, 7 pages.

*Primary Examiner* — Sean T Motsinger
(74) *Attorney, Agent, or Firm* — IPHORIZONS PLLC; Narendra Reddy Thappeta

(57) ABSTRACT

Aspects of the present disclosure are directed to extracting textual information from image documents. In one embodiment, a system, upon receiving a request to extract textual information from an image document, a digital processing system performs character recognition based on content of the image document using multiple approaches to generate corresponding texts. The texts are then combined to determine a result text representing the textual information contained in the image document. The result is then provided as a response to the request.

20 Claims, 10 Drawing Sheets

(56) References Cited

U.S. PATENT DOCUMENTS

| | | | | |
|---|---|---|---|---|
| 2011/0069180 A1* | 3/2011 | Nijemcevic | ........ | G06V 10/245 |
| | | | | 348/333.12 |
| 2012/0127540 A1* | 5/2012 | Moore | ............... | H04N 1/00957 |
| | | | | 358/474 |
| 2014/0093161 A1* | 4/2014 | Oda | .................. | G06V 30/1916 |
| | | | | 382/159 |
| 2014/0270528 A1* | 9/2014 | Ramos | .................. | G06V 20/63 |
| | | | | 382/170 |
| 2015/0254507 A1* | 9/2015 | Lin | ........................ | G06V 20/62 |
| | | | | 382/176 |
| 2015/0278593 A1* | 10/2015 | Panferov | ............ | G06V 30/1914 |
| | | | | 382/182 |
| 2015/0286888 A1* | 10/2015 | Maison | .................. | G06V 20/20 |
| | | | | 382/182 |
| 2015/0379343 A1* | 12/2015 | Powell | .................. | G06F 18/251 |
| | | | | 382/229 |
| 2016/0004692 A1* | 1/2016 | Rogowski | ............... | G09G 5/00 |
| | | | | 704/3 |
| 2017/0330049 A1* | 11/2017 | Kalyuzhny | .......... | G06V 30/418 |
| 2019/0188465 A1* | 6/2019 | Tripuraneni | ....... | G06V 30/1473 |
| 2020/0134348 A1* | 4/2020 | Breslav | ................. | G06F 18/254 |
| 2020/0401829 A1* | 12/2020 | Xin | ................. | G06V 30/19153 |
| 2021/0097274 A1* | 4/2021 | Gligan | .................. | G06F 18/285 |
| 2022/0207268 A1* | 6/2022 | Gligan | .................. | G06F 40/137 |
| 2022/0309813 A1* | 9/2022 | Melchy | .................. | G06N 3/045 |
| 2023/0162516 A1* | 5/2023 | Singaraju | .............. | G06V 30/41 |
| | | | | 382/229 |

* cited by examiner

Pipeline - 1

OCR Output me CALIFORNIA as DRIVER LICE B0473881 CLASS: C ANTHONY HOPKINS PO 4 BEVERLY RriLs CA 90213 SEX:M HAIR: HHT EYES: BLU HT:S-11 HT: 170 Pop: 03 wo) bin 06/12/93 616 0B/ FD/97 1044

Extracted Text 510

"dateOfBirth": "12/6/1993",
"dateOfExpiry": " ",
"dateOfIssue": " ",
"firstName": "ANTHONY",
"gender": "M",
"identificationNumber": "B0473881",
"issuedCountry": "UNITED STATES OF AMERICA",
"issuingAuthority": "CALIFORNIA",
"lastName": "HOPKINS",
"name": "ANTHONY HOPKINS"

FIG. 5A

Pipeline - 2

OCR Output wme CALIFORNIA me DRIVER LICENSE B0473881 cuess:C EXPIRES 03-06-97 ANTHONY HOPKINS BEVERLY HILLS CA 90213 SEX: M HAIR: HHT EYES:BLU HT:S-11 WT: 170 DOB: 03-06-25 } Fepliy 06/12/93 616 0B/ FD/97 1044

Extracted Text 520

"dateOfBirth": "06/03/1925",
"dateOfExpiry": "06/03/1997",
"dateOfIssue": "12/6/1993",
"firstName" : "ANTHONY",
"gender": "M",
"address": "BEVERLY HILLS CA 90213",
"identificationNumber": "B0473881",
"issuedCountry": "UNITED STATES OF AMERICA",
"issuingAuthority": "CALIFORNIA",
"lastName": "HOPKINS",
"name": "ANTHONY HOPKINS"

FIG. 5B

Pipeline - 3

OCR Output

BEVERLY HILLS CA 9Geiy fH OHRIR. HHT SEX: M EYES BLU Heil WT t70 ! wi ~. <lo. Lege eb SR ANTHONY HOPKINS A PC BA S540

Extracted Text  530

"dateOfBirth" : "",
"dateOfExpiry": "",
"dateOfIssue": "",
"firstName": "ANTHONY",
"gender": "M",
"address": "BEVERLY HILLS CA",
"identificationNumber": "",
"lastName": "CURTIS",
"name": "ANTHONY HOPKINS"

FIG. 5C

Pipeline - 4

OCR Output wre CALIFORNIA <== DRIVER LICENSE B@473881 coless:C EXPIRES 03-06-97 ANTHONY HOPKINS PO BX S4 0 BEVERLY HILLS CA 90213 SEX:H HAIR: HHT EYES:BLU HT:S-11 HT: {70 DOB 03-06-25 06/12/93 616 OD/ FD/97 1044

Extracted Text  540

"dateofBirth": "06/03/1925",
"dateOfExpiry": "06/03/1997",
"dateOfIssue": "12/6/1993",
"firstName" : "ANTHONY",
"gender": "",
"address": "BEVERLY HILLS CA 90213 ",
"identificationNumber": ,
"issuedCountry": "UNITED STATES OF AMERICA",
"issuingAuthority": "CALIFORNIA",
"lastName": "HOPKINS",
"name": "ANTHONY HOPKINS"

FIG. 5D

Pipeline - 5

OCR Output wee CALIFORNIA oe B0473881 cass cC EXPIRES 00-06-97 . ANTHONY HOPKINS Xx BEVERLY HILLS CA 902123 SEX M MAIR WHT EYES BLU HT S-11 WT 170 DOB 03 0s 25 Jo. Fof LN - OB/ 12/9) 610 OB/ rosvr 10a as 4

Extracted Text 550

"dateOfBirth": "",
"dateOfExpiry": "",
"dateOfIssue": "",
"firstName": "ANTHONY",
"gender": "M",
"address": "BEVERLY HILLS CA 902123",
"identificationNumber": "B0473881",
"issuedCountry": "UNITED STATES OF AMERICA",
"issuingAuthority": "CALIFORNIA",
"lastName": "CURTIS",
"name": "ANTHONY HOPKINS"

FIG. 5E

Pipeline - 6

OCR Output me CALIFORNIA as. 80473881 cass c NTHONY HOPKINS Xx BEVERLY HILLS CA 90213 OB/12/90 6A6 OB FOJwT?

Extracted Text 560

"dateOfBirth": "",
"dateOfExpiry": "",
"dateOfIssue": "",
"firstName": "NTHONY",
"gender": "",
"address": "BEVERLY HILLS CA 902123",
"identificationNumber": "",
"lastName": "HOPKINS",
"name": "NTHONY HOPKINS"

FIG. 5F

Pipeline - 7

OCR Output wee CALIFORNIA <me ay aaaT cnssc I ANTHONY HOPKINS X BEVERLY iis CA 99213 . SEX: M IR: WHT EYES: BLU HT:S-11 120 DOB 03-06-25 Y a 8 ; - 05/12/93 616 0B/ FD/97 1044

Extracted Text 570

"dateOfBirth": "06/03/1925",
"dateOfExpiry":"12/05/1993",
"dateOfIssue": "",
"firstName": "ANTHONY",
"gender": "M",
"address": "BEVERLY iis CA 99213 ",
"identificationNumber": "",
"lastName": "HOPKINS",
"name": "ANTHONY HOPKINS"

FIG. 5G

Pipeline - 8

OCR Output

CALIFORNIA me DRIVER LICENSE B0473881 class:C EXPIRES 03-06-97 ANTHONY HOPKINS BEVERLY HILLS CA 90213 SEX: M HAIR: HHT EYES:BLU HT:5-11 WT: 170 DOB: 03-06-25 } 06/12/93 616 0B/ FO/97 1044

Extracted Text 580

"dateOfBirth": "06/03/1925",
"dateofExpiry": "06/03/1997",
"dateOfIssue": "12/6/1993",
"firstName": "ANTHONY",
"gender": "M",
"address": "BEVERLY HILLS CA 90213 ",
"identificationNumber": "B0473881",
"issuedcountry": "UNITED STATES OF AMERICA",
"issuingAuthority": "CALIFORNIA",
"lastName": "HOPKINS",
"name": "ANTHONY HOPKINS"

FIG. 5H

| Field | Non-Empty Value | Occurrence | Count |
|---|---|---|---|
| dateOfBirth | 12/6/1993 | P1 | 1 |
| | 06/03/1925 | P2, P4, P7, P8 | 4 (Max) |
| dateOfExpiry | 06/03/1997 | P2, P4, P8 | 3 (Max) |
| | 12/05/1993 | P7 | 1 |
| ... | ... | ... | ... |
| address | BEVERLY HILLS CA 90213 | P2, P4, P5, P6, P8 | 5 (Max) |
| | BEVERLY HILLS CA | P3 | 1 |
| | BEVERLY iis CA 99213 | P7 | 1 |
| ... | ... | ... | ... |

620

```
"dateOfBirth": "06/03/1925",
"dateOfExpiry": "06/03/1997",
"dateOfIssue": "12/6/1993",
"firstName": "ANTHONY",
"gender": "M",
"address": "BEVERLY HILLS CA 90213",
"identificationNumber": "B0473881",
"issuedcountry": "UNITED STATES OF AMERICA",
"issuingAuthority": "CALIFORNIA,
"lastName": "HOPKINS",
"name": "ANTHONY HOPKINS"
```

EXTRACTING TEXTUAL INFORMATION FROM IMAGE DOCUMENTS

PRIORITY CLAIM

The instant patent application is related to and claims priority from the co-pending India provisional patent application entitled, "EXTRACTING TEXTUAL INFORMATION FROM IMAGE DOCUMENTS", Serial No.: 202121054248, Filed: 24 Nov. 2021, which is incorporated in its entirety herewith.

BACKGROUND OF THE DISCLOSURE

Technical Field

The present disclosure relates to enterprise systems and more specifically to extracting textual information from image documents.

Related Art

An image document refers to a document in which at least a portion of the document is represented as images, which are each stored in the form of respective set of pixel values. As is well known in the relevant art, each pixel value specifies the visual representation (color, brightness, etc.) of the corresponding pixel/point of the image. Examples of such images or image documents are in formats specified by PDF (Portable Document Format), JPG, PNG, GIF, etc. as is also well known in the relevant arts.

Textual information refers to characters used in printing/writing. The term "text" refers to a collection of characters present in an image document. When a text is present in image(s) of the image documents, each character of the text is represented as corresponding pixel values in the image documents.

However, characters represented as codes (e.g., in accordance with ASCII convention) are typically more suitable for storage and/or processing (e.g., searching) in machines. Extracting textual information from image documents entails generating the codes representing any characters (and thereby texts) present in the images of image documents.

Aspects of the present disclosure are directed to extracting textual information from image documents.

BRIEF DESCRIPTION OF THE DRAWINGS

Example embodiments of the present disclosure will be described with reference to the accompanying drawings briefly described below.

FIGS. 5A-5H depict the different texts extracted from the same image document in one embodiment.

FIG. 6 depicts a result text representing the textual information extracted from an image document in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure is directed to extracting textual information from image documents. In an embodiment, a system, upon receiving a request to extract textual information from an image document, a digital processing system performs character recognition based on content of the image document using multiple approaches to generate corresponding texts. The texts are then combined to determine a result text representing the textual information contained in the image document. The result is then provided as a response to the request.

According to an aspect, character recognition based on such multiple approaches is realized by generating enhanced image documents using corresponding image enhancements on the image document. Character recognition is thereafter used on each of the enhanced image documents to generate a respective text. In an embodiment, the respective text is generated by first converting, using character recognition, the enhanced image documents to corresponding textual representations, and thereafter applying a set of regular expressions to identify the texts from the textual representations.

According to another aspect, the image document is pre-processed to generate a processed image document on which the image enhancements are applied. Pre-processing may entail one or more of image rescaling, image skew correction and background cropping. In an embodiment, the image enhancements are performed in parallel. The result text is determined as the text having the maximum occurrence in the texts.

According to one more aspect, an ensemble data is maintained specifying a list of image enhancements. For each image enhancement, a corresponding image processing techniques to be performed in series are also specified. To process a request, the image enhancements to be applied are selected from the list of image enhancements specified in the ensemble data.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
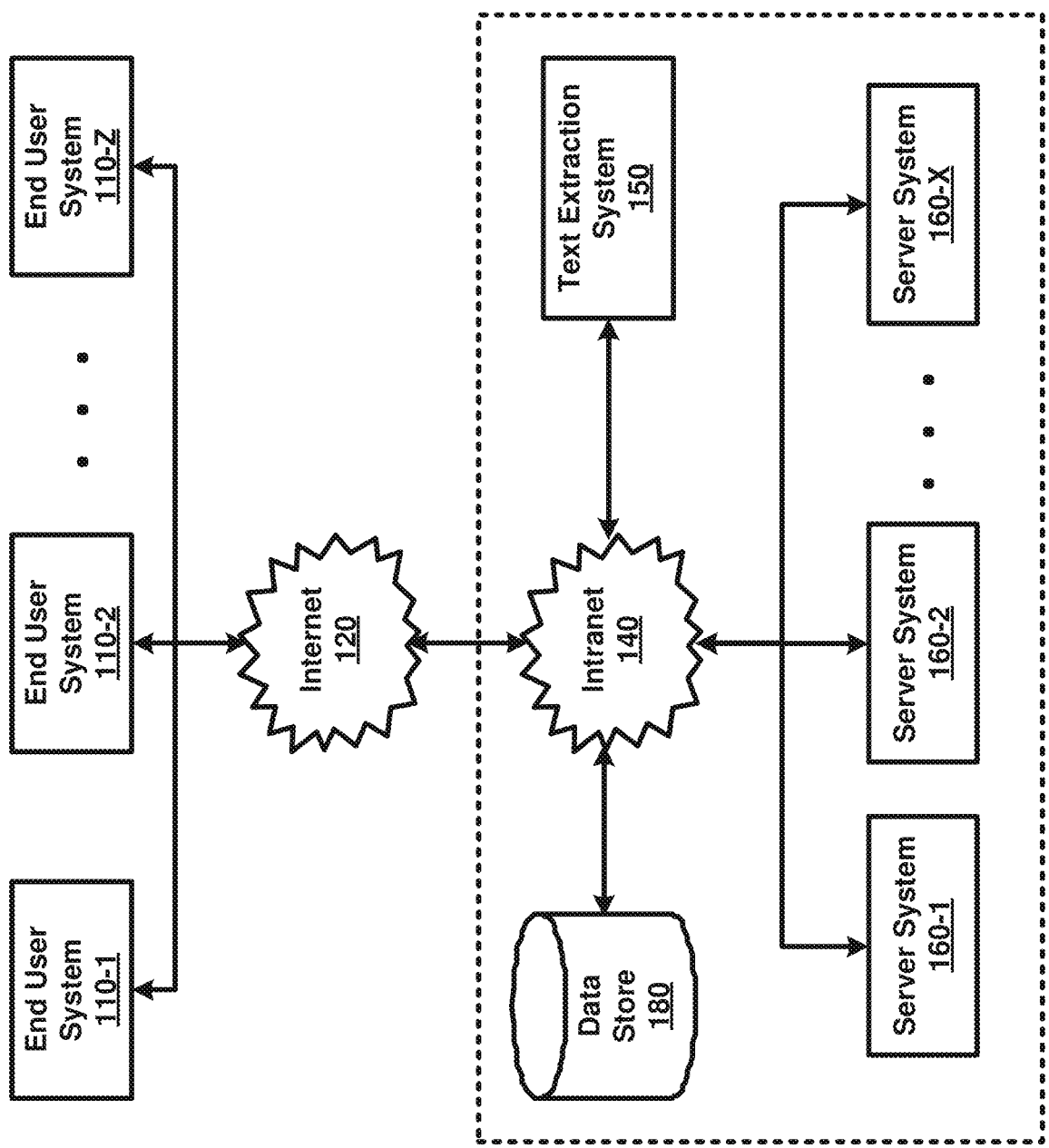
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing end-user systems 110-1 through 110-Z (Z representing any natural number), Internet 120, intranet 140, server systems 160-1 through 160-X (X representing any natural number), Text Extraction System (TES) 150 and data store 180. The end-user systems and server systems are collectively referred to by 110 and 160 respectively.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between server systems 160, TES 150 and data store 180, all typically provided within an enterprise (as indicated by the dotted boundary). Internet 120 extends the connectivity of these (and other systems of the enterprise) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies the target application, the packet may be said to be directed to such application as well.

Data store 180 represents a non-volatile (persistent) storage facilitating storage and retrieval of a collection of data by applications executing in server systems 160 (and also TES 150). Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of end-user systems 110 represents a system such as a personal computer, workstation, mobile device, computing tablet etc., used by users to generate user requests directed to software/enterprise applications executing in server systems 160. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Each of server systems 160 represents a server, such as a web/application server, constituted of appropriate hardware executing software applications capable of performing tasks requested by end-user systems 110. A server system receives a user request from an end-user system and performs the tasks requested in the user request. A server system may use data stored internally (for example, in a non-volatile storage/hard disk within the server system), external data (e.g., maintained in data store 180) and/or data received from external sources (e.g., from the user) in performing the requested tasks/web service operations. The server system then sends the result of performance of the tasks/web service operations to the requesting end-user system 110. The results may be accompanied by specific user interfaces (e.g., web pages) for displaying the results to the requesting user.

It may be appreciated that the performance of tasks in server systems 160 may necessitate extraction of textual information from image documents. For example, in large organizations such as government, enterprise companies, banks, and universities/colleges, there is still a strong reliance on physical document verification.

Manual verification of documents for identification is laborious. For example, customer verification process in banks requires the banks to collect identity documents from customers like passport, government IDs, etc. and manually validate them (typically using a dedicated team of people who will look at the documents customers have provided) based on the information provided in the documents. It may be noted that not only are the receiving documents to be organized and categorized, extracting meaningful information manually can require a lot of time and effort. Currently, such organizations employ data entry teams whose sole purpose is to take these physical documents, manually re-type the information, and then save the typed information into the system which is cumbersome. The delay in processing the documents may inconvenience the customers as well as employees ultimately resulting in decreased productivity. Accordingly, there is a general need to extract the textual information from image documents.

TES 150 provided according to several aspects of the present disclosure facilitates extracting textual information from image documents while addressing one or more of the requirements noted above. Upon receiving an image document from one of end-user systems 110, each server system 160 may send a request to process the received image document to TES 150 and receive the extracted textual information from TES 150 as a response to the process request. The manner in which TES 150 extracts textual information from image documents (received from server systems 160) is described below with examples.

3. Extracting Textual Information from Image Documents

Figure 2:
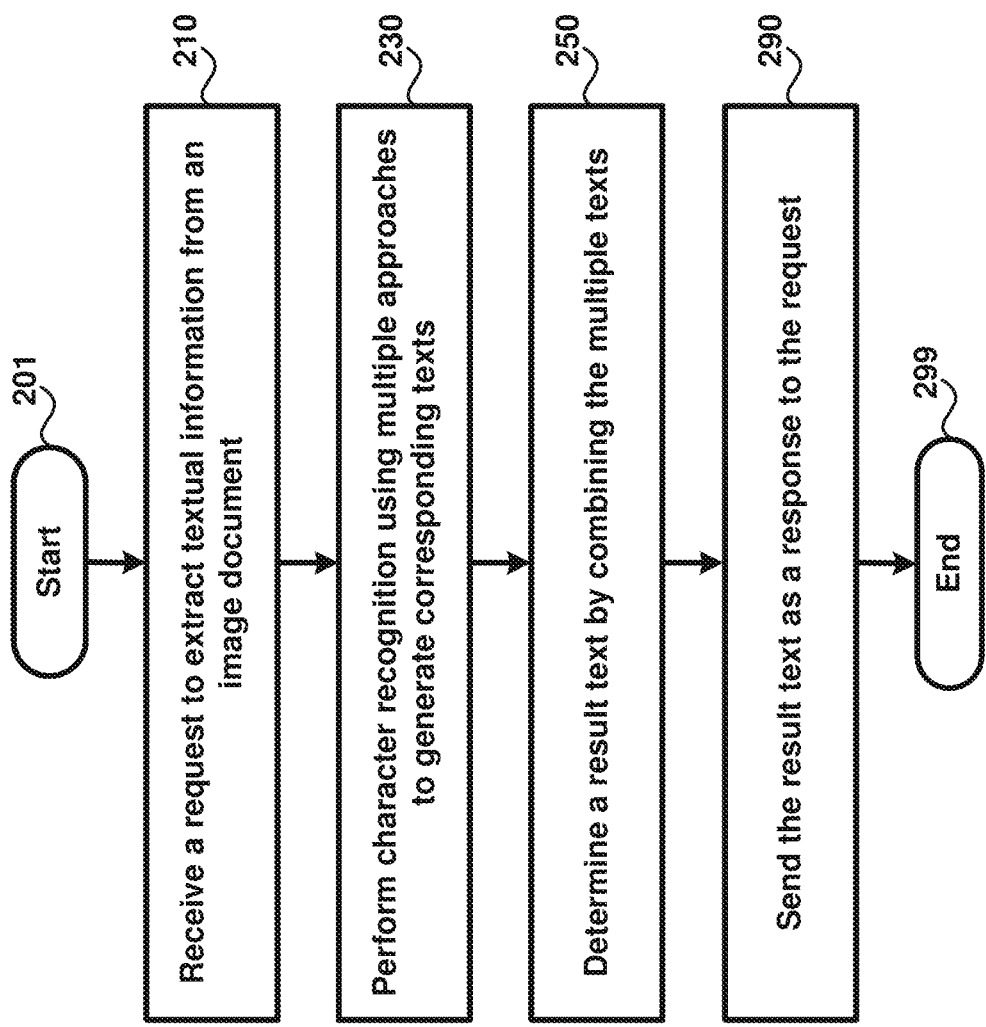
FIG. 2 is a flowchart illustrating the manner in which textual information is extracted from an image document according to an aspect of the present disclosure.

FIG. 2 is a flow chart illustrating the manner in which textual information is extracted from image documents according to aspects of the present disclosure. The flowchart is described with respect to the systems of FIG. 1, in particular TES 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, TES 150 receives a request to extract textual information from an (target) image document. The request may be received from one of server systems 160. The target image document may be received as part of the request. Alternatively, the target image document may be stored in data store 180, with the request indicating a unique identifier of the target image document. As noted above, the image document contains one or more images, with each image being stored in the form of respective set of pixel values.

In step 230, TES 150 performs character recognition using multiple approaches to generate corresponding texts. Thus, each of the generated texts represents the textual information contained in the processed image document. Performing character recognition generally entails processing and examination of the digital/pixel values representing the images in the image document.

In step 250, TES 150 determines a result text by combining the multiple texts. In general, parts of such multiple texts may be examined to determine which of the multiple texts accurately represents the corresponding portion of the image document. The entire result text may be constructed piece by piece accordingly.

In step 290, TES 150 provide the result text as a response to the request. The response may be sent to one of server systems 160 from which the request was received. Control passes to step 299, where the flowchart ends.

Thus, TES 150 extracts textual information from image documents (received from server systems 160). The manner in which TES 150 may be implemented to provide several aspects of the present disclosure according to the steps of FIG. 2 is illustrated below with examples.

4. Text Extraction System

Figure 3:
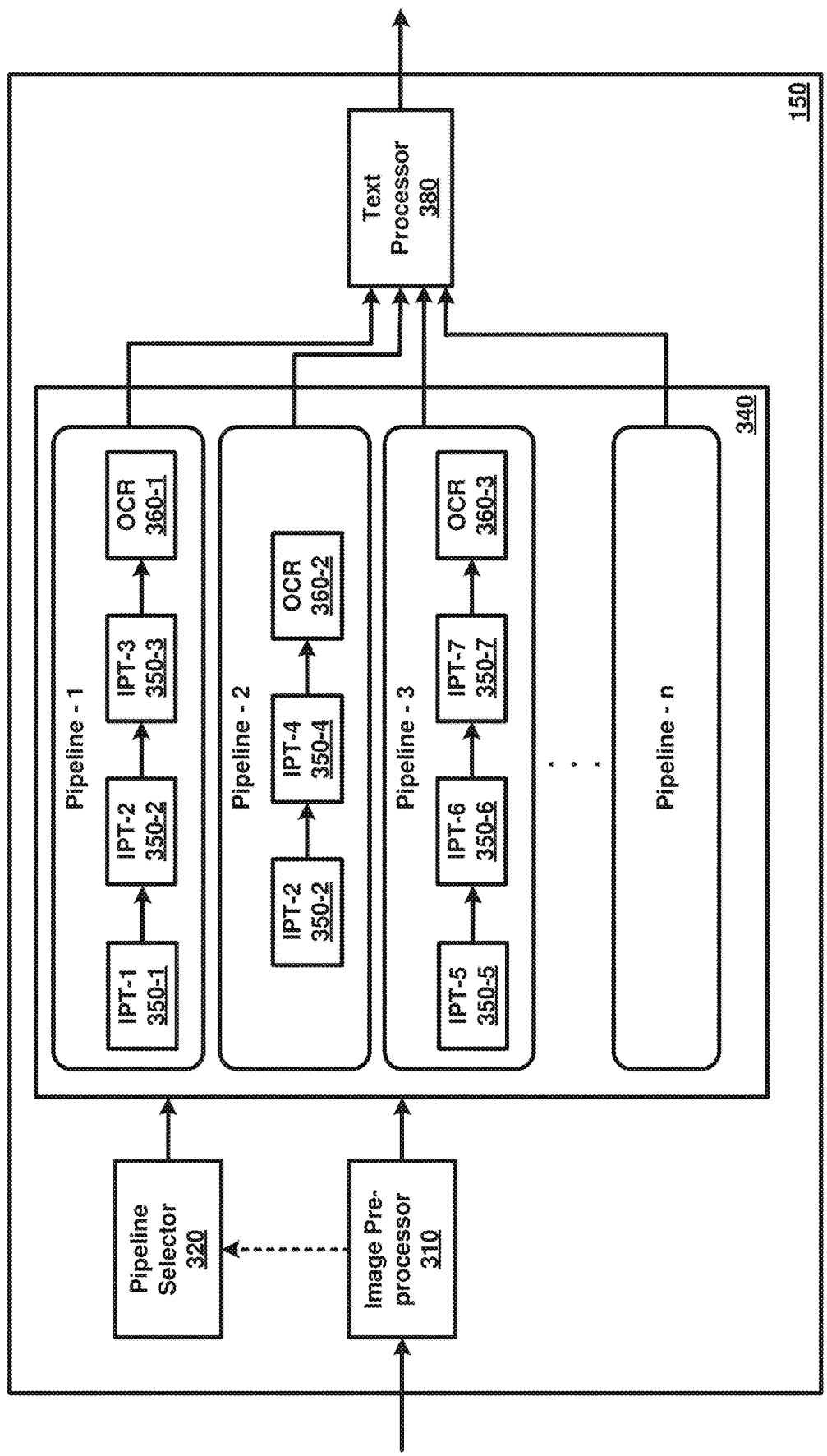
FIG. 3 is a block diagram illustrating the internal details of a digital processing system in an embodiment.

FIG. 3 is a block diagram of a text extraction system (150) according to several aspects of the present disclosure. The block diagram is shown containing image pre-processor 310, pipeline selector 320, pipelines 340 (in turn shown containing Pipeline-1, Pipeline-2, Pipeline-3, . . . Pipeline-n) and text processor 380. Each pipeline (such as Pipeline-1) is shown containing one or more IPT (image processing technique) modules 350-1 through 350-7 and OCR (optical character recognition) engines 360-1 through 360-3.

Broadly, it may be observed that different ones of pipelines (1-n) operate to perform character recognition (e.g., using OCR in the below embodiment) according to a corresponding approach to generate a respective text. Image pre-processor 310 performs any needed pre-processing for each of the pipelines. Text processor 380 combines the multiple texts to generate the desired result text representing the textual information in the image document. Each of the blocks in the Figure is described in detail below.

Image pre-processor 310 performs basic/prerequisite image processing on the target image document (received from one of server systems 160 via path 145) to generate a processed image document. According to an aspect, such pre-processing includes image rescaling (e.g., image document is resized and rescaled to a pre-defined size), image skew correction (e.g., image document is rotated to correct the skew if the text is not horizontal) and background cropping (e.g., if the text in the image document contains any background). A brief description of each of the pre-processing actions is provided below:

Image Rescaling—As is well known in the relevant arts, image rescaling refers to resizing the image to an optimal resolution suitable for subsequent processing. In an embodiment, OCR (optical character recognition) gives accurate output for images with 300 DPI (dots per inch) resolution. Keeping DPI lower than 200 may give unclear and incomprehensible results while keeping the DPI above 600 may unnecessarily increase the size of the output file without improving the extraction. As part of image rescaling, the images are resized to an optimal resolution which makes it best for OCR to extract text properly. In one embodiment, the target image document is resized and rescaled to an optimal size of 800*600 pixels resolution with 300 DPI settings.

Image Skew Correction (also referred to as Auto Rotation)—A skewed image is defined as a document image that is not straight. Skewed images directly impact the line segmentation of the OCR engine which reduces its accuracy. As such for image documents where the textual information is not horizontal, deskewing (rotation of) the image documents is performed to ensure that the text is horizontal and can be easily read by the OCR engine.

Background Cropping—Refers to removal of any background to the textual information. Image pre-processor 310 targets separating the foreground which is the textual information from the background (any image data). Accordingly, unwanted areas in the target image document that do not contain any (or non-substantive) textual information are removed.

After performing one or more of the pre-processing actions noted above, image pre-processor transforms the target image document (represented by a set of digital/pixel values) into the processed image document (represented by another set of digital/pixel values) and forwards the processed image document to pipelines 340 for parallel image enhancements of the processed image document. The manner in which parallel image enhancements are performed using image processing pipelines is described below with examples.

5. Image Processing Pipelines

Pipelines 340 performs multiple different image enhancements on the processed image document received from image pre-processor 310 to generate corresponding enhanced image documents and thereafter converts the corresponding enhanced image documents to corresponding textual representations. The processed image document received from image pre-processor 310 is provided as input to all of the pipelines (Pipeline-1, Pipeline-2, . . . Pipeline-n), with each pipeline performing a corresponding image enhancement. The pipelines are implemented to execute in parallel, for example, as different threads/processes in a known way.

Each pipeline (e.g., pipeline-1) is shown containing a combination/sequence of image processing technique modules (IPT-1 350-1, IPT-2 350-2, IPT-3 350-3 in pipeline-1) and also a corresponding OCR engine (360-1 in pipeline-1). Each IPT module is designed to perform a corresponding image processing technique on the processed image document. Accordingly, the IPT modules in a single pipeline operate to perform a sequence of image processing techniques in series/stages (one after the other) on the processed image document. The processed image document (represented by corresponding pixel values) is provided as an input to the first IPT module (e.g., 350-1, 350-2, 350-5) in the sequence, which after performing the appropriate image processing, forwards the resultant image document to the next IPT module (e.g., 350-2, 350-4, 350-6) in the sequence until the image document is processed by all of the sequence of the IPT modules. The final IPT module (e.g., 350-3, 350-4, 350-7) in the sequence forwards the resultant image document (referred to as the enhanced image document) to the corresponding OCR engine for conversion of the textual information from the enhanced image document.

It should be noted that though pre-processing transforms the target image document (represented by a set of digital/pixel values) into the processed image document (represented by another set of digital/pixel values), and the sequences of image processing techniques in each pipeline thereafter transforms the processed image document to corresponding enhanced image documents (represented by corresponding sets of digital/pixel values), such transformation is performed without considerably losing any textual information present in the target image document, as will be apparent to one skilled in the relevant arts.

Each OCR engine (such as 360-1, 360-2, etc.) converts the corresponding enhanced image document in each pipeline of pipelines 340 to a corresponding textual representation (containing characters), and forwards the converted textual representations to text processor 380. In particular, each OCR engines identifies characters present in the pixel values of the enhanced image document. As is well known, such identification is typically performed by searching for pre-defined patterns of pixel values (corresponding to different characters) in the enhanced image document. When a pre-defined pattern is found (either completely or partially), the OCR engine identifies that the character corresponding to the pre-defined pattern is present in the enhanced image document.

Though each pipeline is shown containing a corresponding OCR engine, it may be appreciated that in alternative embodiments, a single common OCR engine may be used by all the pipelines for the conversion of the enhanced image documents to corresponding textual representations. In addition, it may be appreciated that techniques alternative to OCR may be employed for character recognition. The pipelines may also be designed suitable for such character recognition techniques. An example of such an alternative is image character recognition (ICR), well known in the relevant arts.

It may be further appreciated that an ensemble (collection operating together) of image processing techniques is used to perform multiple different image enhancements on the processed image document. According to an aspect, TES 150 identifies the specific ensemble of image processing techniques to be used for a specific target/processed image document as described below with examples.

6. Selecting Ensemble of Image Processing Techniques

Pipeline selector 320 identifies the specific ensemble of image processing techniques to be used for a target image document. In one embodiment, pipeline selector 320 maintains an ensemble data specifying a list of image enhancements and for each image enhancement, a corresponding set of image processing techniques to be performed in series. In response to the request received from one of server systems 160, pipeline selector 320 selects the specific set of image enhancements (that is, the specific ensemble of image processing techniques) from the list of image enhancements specified in the ensemble data.

The selection of the specific set of image enhancements/pipelines to be employed for a target image document may be based on one or more properties of the target image document such as source of the document (e.g., scanner, photo, etc.), the resolution (e.g., high, low, etc.), the number and types of colors in the target document, etc. Alternatively, rule-based or machine learning based techniques may be employed for the selection of the specific set.

Some example image processing techniques that may be used in pipelines 340 to improve the quality of the target image is shown in Table 1 below:

TABLE 1

| Image Cleaning | Image Segmentation | Image Filtering | Skew Correction | Image Transformation |
|---|---|---|---|---|
| Denoising | Binarization | Sharpening | Auto Rotation | Grayscale |
| Erosions | | Blurring | Background Cropping | Contrasting |
| Dilations | | Image Enhancer | | Brightening |
| Shadow removal | | | | |

The various image processing techniques listed in Table 1 have been partitioned according to their functionality i.e., whether the technique does image segmentation or whether it filters the image, etc. These techniques have been primarily classified into five different categories:

Image Cleaning: Involves removing unwanted pixels of the image document which are likely to contain noise or distortions. Techniques like Noise removal, Dilation of the image to add pixels to the boundaries, and Erosion to remove pixels from the boundaries are used. In some cases, image documents might even contain shadows or some kind of dark areas, shadow removal technique is performed on the image so that these areas become brighter for OCR to read the text in there.

Image Segmentation: Involves foreground and background segmentation techniques like Otsu's Binarization, Adaptive Gaussian Thresholding, etc. Segmentation is performed on the denoised and cleaned image document that is got from a previous stage (in the sequence of IPTs). The image document is converted into a black and white image because it works best with OCR than colored images.

Image Filtering: Filters are used to enhance the image to make it better readable by the OCR engine. This may include techniques that are used to change/modify the image pixels based on some filters. This phase includes Unsharp masking which uses a mask/filter to sharpen an image that is blurred, Image Blurring, and Image Enhancer are used.

Skew Correction: As noted above, Skew correction techniques operate to ensure that the text is horizontal and can be easily read by the OCR engine.

Image Transformation: The (input) processed document image is transformed into a different form. For example, rescaling or resizing an image to an optimal size that works best for OCR is one of the transformations that may be performed. Other transformations on the rescaled image may include Gray scaling an image, Image contrasting, Image brightening based on its pixels, etc.

A brief description of some of the image processing techniques shown in Table 1 is provided below.

Noise Removal (also referred to as Denoising)—Noise refers to a random variation of brightness or color in an image, which makes it difficult for OCR to read the text. Certain types of noise cannot be removed by OCR in the processing step, which can cause accuracy rates to drop. The main objective of the noise removal is to smoothen the image by removing small dots/patches which have high intensity than the rest of the image. Noise removal can be performed for both colored and binary images.

Binarization—Binarization involves converting a colored image into black and white pixels which can be achieved by fixing a threshold value. OCR produces good results for black and white/gray-scaled images than colored images and does this internally using the Otsu algorithm (well known in the art), but the result can be suboptimal, particularly if the page background is of uneven darkness. There is no single binarization method that works well for all the image documents. In general, all filters perform differently on different images which results in varied outputs. Binarization is performed using a threshold value to filter out the pixels, so this technique is also referred to as Image Thresholding. For optimal results, 3 different types of thresholding are used for performance of binarization which are: Simple thresholding, Adaptive thresholding, and Otsu thresholding.

Sharpening—Image sharpening targets enhancing the edges in an image document particularly focusing on enhancing the text characters, thereby producing good results for text extraction. Sharpening the images may reduce and correct the amount of blur captured using a camera or scanner. It may be noted that the system should not sharpen the image document too much as it might increase the noise in the image document.

Blurring—In contrast to image sharpening, here the image document is blurred. Blurring helps in reducing the noise to some extent. Image blurring is usually achieved by convolving the image with a low-pass filter kernel. There are 3 ways of blurring the image: Averaging, Median Blurring, and Gaussian Blurring.

Image Brightening—Usually, some of the scanned images contain dark regions because of which OCR might not be able to convert the text in that region. As such, the image pixels are brightened to make the text appear properly for OCR to recognize.

Contrasting—This technique is performed to increase the intensity of the pixels which makes it appear in a greater degree of colors or grayscale variation than those of images with low contrast. Contrasting also helps in separating the foreground from the background.

It may be appreciated that not all image documents need to be processed by all of the image processing techniques. For example, if the image document is of high quality and resolution, there may be no need to perform most of the IPTs. Only rescaling the image document to optimal size and performing auto rotation may be performed for high quality image documents. Similarly, for image documents that might be blurred or noisy, all of the IPTs may be performed in sequence on the image document to enhance the quality and remove the noise from the image document. The pipelines are designed/selected in such a way that the pipelines (340) include all the valid combinations of image processing techniques that work for most of the image documents even in the worst case.

It may be further appreciated that all of the image processing techniques (of Table 1) primarily focus on enhancing the image document to make it better readable for OCR. Any single order/set of techniques may not be suitable for all image documents. For example, the sequence of IPTs "Denoising—Sharpening— Grayscaling" might work for one image document but the same set of techniques in the same order might not work for another image document. Accordingly, an ensemble technique that uses different valid combinations of the techniques is used inside pipelines 340.

As noted above, after applying different combinations of the image processing techniques, the enhanced image documents are sent to the corresponding OCR engines (such as 360-1, 360-2, etc.) which in turn converts the corresponding enhanced image documents to corresponding textual representations (containing characters identified based on the pixel values) and forward the converted textual representations to text processor 380. The operation of text processor 380 is described below with examples.

7. Text Processor

Text processor 380 receives the various converted textual representations from the OCR engines of different pipelines (Pipeline-1, Pipeline-2, etc.) in pipelines 340, and then applies a set of regular expressions on the textual representations to identify the respective texts of interest. In one embodiment, the text of interest is in the form of key-value pairs. It should be noted that the values in the pairs may be of different data types such as dates, names, numbers, etc. and accordingly different sets of regular expressions may be required to be applied to identify the values from the textual representations. Some of the use cases/data types that may be provided by text processor 380 are described below:

Case 1: Matching Dates—To match Dates (Date of Birth, Expiry, and Issue of the document), the following regular expressions are used:

```
full_months = [month for month in calendar.month_name if month]
upper = [x.upper( ) for x in full_months]
for items in upper:
full_months.append(items)
short_months = [d[:4] for d in full_months]
shortest_months = [d[:3] for d in full_months]
months = '|'.join(short_months + full_months + shortest_months)
date_reg_exp = re.compile(
r'(\d{1,2}(/|-|\.|\s+)(' + months + ')(/|-|\.|\s+)\d{4})|(\d{4}(/|-
|\.|\s)(' + months + ')(/|-|\.|\s)\d{2})|((' + months + ')\s\d{2}(,|-
|\.|,|\s)?\s\d{4})|(\d{2}(/|-|\.)\d{2}(/|-|\.)\d{2,4})|(\d{4}(/|-
|\.)\d{2}(/|-|\.)\d{2})|(\d{1,2}(/|-|\.|\s)\d{1,2}(/|-|\.|\s)\d{4})')
```

These regular expression cover dates in both Numeric as well as word formats like (22.02.87, 22/02/1987, 22 FEB 1987, 22 FEB 87, 22 February 1987, etc.) Once all the dates are extracted, they may be sorted (by text processor 280) to get DOB, DOE, and DOI according to their chronological order.

Case 2: Matching ID NO.—Identification numbers typically contain a certain number of digits/letters based on the document type. For a particular country, if the License No. is of 8 characters, the first character being letter followed by digits, the following regular expression is used:

regExPattern=r"[A-Z] [0-9] [7]\b"

Similarly, multiple regular expression patterns are used for different document types available to extract ID NO.

Case 3: Matching Names—For matching names from a given document, various methods may be used. Keys in the document like "Name", "First Name", "Last Name" are used to find the name fields or extract names using line numbers in some scenarios where names appear on certain places/locations in the documents. In other scenarios, names may appear between specific keywords in the document, so regular expression patterns to find such keywords and extract names between those keywords may be employed for extracting the matching names.

Case 4: Matching Address—Similar to how names are extracted, address may also be extracted either using line numbers or using specific keywords that occur before or after address like 5-digit Pin code/Zip that occurs at the end of the address, etc.

Case 5: Matching Gender—Gender is present in most of the image documents associated with one of the keywords "Gender", "Sex" and "Gender/Sex". The regular expression may look for these keywords to extract gender.

After extracting the respective texts (containing key-value pairs) from corresponding textual representations using the regular expressions noted above, text processor 380 combines the respective texts to determine a result text representing the textual information contained in the target image document. In one embodiment, text processor 380 determines the result text as the text having the maximum occurrence in extracted respective texts. In the above noted embodiment, the determination of the result text is performed for each key-value pair. After determining the result text, text processor 380 sends the result text as a response to the request to the requesting server system 160 via path 145.

Thus, TES 150 extracts textual information from image documents (received from server systems 160). An example operation of TES 150 during extraction of textual information from a specific image document is described below with examples.

8. Illustrative Operation

FIGS. 4A-4B, 5A-5H and 6 together illustrate the manner in which extracting textual information from image documents is performed (by TES 150) in one embodiment. Each of the Figures is described in detail below.

Figure 4A:
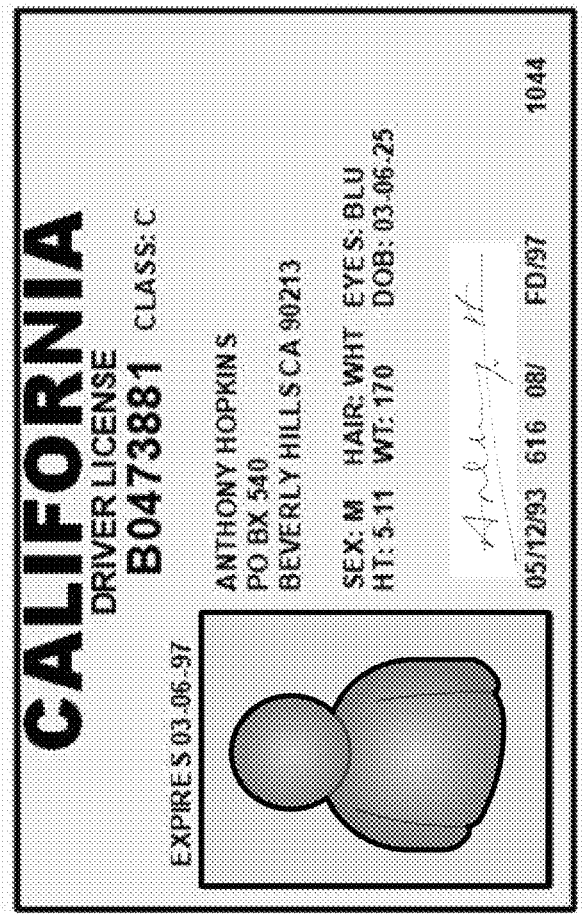
FIG. 4A depicts a sample image document from which textual information is sought to be extracted.

FIG. 4A depicts a sample image document from which textual information is sought to be extracted. In particular, image document 400 is a driving license of a user/customer submitted by the user using one on end user systems 110. Image document 400 may be received by one of server systems 160, stored in data store 180, and then a request may be sent by a server system 160 to TES 150 to extract the textual information. It may be readily observed that image document 400 includes various key-value pairs (such as Sex, HT/height, WT/weight) and also simple textual information (such as name and address). In the following disclosure, the term "field" is used to refer to such key-value pairs and also simple textual information.

Figure 4B:
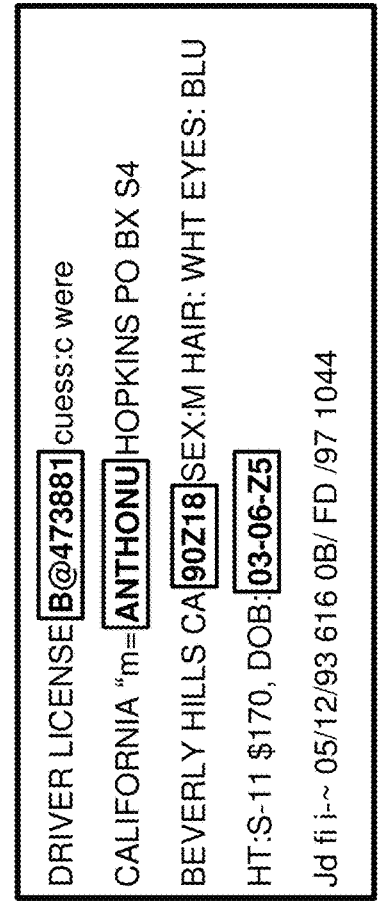
FIG. 4B depicts the text output generated by an OCR engine in one embodiment.

FIG. 4B depicts the text output generated by an OCR engine in one embodiment. Specifically, text output 450 represents the text generated after passing image document 400 of FIG. 4A directly to an OCR engine (such as 360-1 through 360-3) noted above. It may be readily observed that the text portions shown in rectangles are incorrect/not accurate, that is, do not correspond to the information in image document 400. Such inaccuracies indicate that the image document is not being properly read/processed by the OCR engine to distinguish between the characters.

According to aspects of the present disclosure, TES 150 upon receiving a request to extract textual information from image document 400, pre-processes the received image document and then feeds the processed image document to one or more image processing pipelines. The description is continued assuming that 8 image processing pipelines are used for processing the processed image document. The specific combination/sequence of image processing techniques corresponding to the 8 image processing pipelines is shown in Table 2 below.

TABLE 2

| Pipeline | Image Processing Techniques |
|---|---|
| Pipeline-1 | Denoising -> Blurring -> Grayscaling |
| Pipeline-2 | Denoising -> Sharpening -> Binarization |
| Pipeline-3 | Contrasting -> Enhancing |
| Pipeline-4 | Brightening -> Grayscaling |
| Pipeline-5 | Shadow Removal -> Denoising |
| Pipeline-6 | Sharpening -> Brightening -> Binarization |
| Pipeline-7 | Dilation -> Erosion ->Denoising -> Grayscaling |
| Pipeline-8 | Blurring -> Shadow Removal -> Binarization |

It may be appreciated that the set of 8 pipelines shown in Table 2 works well for most of the image documents even in worst-case scenarios (e.g., where the image documents are blurry and includes a lot of noise). The operator "->" in Table 2 indicates the direction of the data flow between the image processing technique modules. For example, for Pipeline-1, the processed image document received from pre-processor 310 is first fed to a Denoising module, whose output (an image document) is then sent to a Blurring module, whose output in turn is then sent to a Grayscaling module. The output (enhanced image document) of the Grayscaling module is sent to a corresponding OCR engine, which then converts the enhanced image document to a corresponding textual representation.

Thus, by the operation of the 8 pipelines in parallel, 8 different enhanced image documents are generated, which are then processed by the corresponding OCR engines to generate 8 different textual representations. All of the 8 textual representations are then processed by text processor 380 to obtain the textual information extracted from image document 400 as described in detail below.

FIGS. 5A-5H depict the different texts extracted from the same image document (400) after being processed by multiple pipelines (of image processing techniques) in one embodiment. Each Figure indicates the name of a corresponding pipeline (e.g., "Pipeline-1") processing the image document (400), an "OCR Output" indicating the output/textual representation (collection of characters) generated by a corresponding OCR engine in the pipeline, and an "Extracted Text" indicating the textual information (texts) extracted by text processor 380 after applying sets of regular expressions. As noted above, the "Extracted Text" is in the form of key-value pairs.

Text portions 510, 520, 530, 540, 550, 560, 570 and 580 represent the textual information extracted based on the same image document 400 after being processed by corresponding 8 pipelines noted in Table 2. It may be appreciated that text portion 510 indicates that the corresponding Pipeline-1 can process and extract Names and ID No. correctly. Text portion 520 indicates that Pipeline-2 can process and extract almost all fields correctly. Text portion 530 indicates that Pipeline-3 extracted only Name and Gender accurately. Text portion 540 indicates that Pipeline-4 extracted all the information except Gender and ID No. as the text appearing did not match the regex patterns designed for that document. Text portion 550 indicates that Pipeline-5 did not do well on extracting dates but it extracted all other fields (key-values) properly. Text portion 560 indicates that Pipeline-6 did not perform well on extracting Dates and Gender but it extracted address, ID No., and names partially. Text portion 570 indicates that Pipeline-7 extracted Names, Gender, DOB, and DOE correctly but did not extract Address, DOI, and ID No. accurately. Text portion 580 indicates that Pipeline-8 extracted all the information accurately.

After extracting the text portions 510 through 580, text processor 380 determines the result text for each field based on the maximum occurrence of each value in the text portions 510 through 580 as described in detail below.

FIG. 6 depicts a result text representing the textual information extracted from an image document in one embodiment. Table 620 depicts the fields such as "dateOfBirth", "address", etc., the different values extracted (in text portions 510 thorough 580) corresponding to each field, the count/number of occurrences of each value among the 8 different text portions. The maximum count for each field is indicated by "(Max)" in the "count" column.

Thus, for the field/key "dateOfBirth", table 620 indicates that there are two values "12/6/1993" and "06/03/1925", with the value "12/6/1993" occurring only 1 time (that is, in the extracted text of 1 pipeline), while the value "06/03/1925" occurs 4 times (that is, in the extracted text of 4 pipelines). Since the value "06/03/1925" occurs more than all the other values, the value "06/03/1925" is selected as the result value corresponding to the key "dateOfBirth". In the scenario, multiple values have the same number of maximum occurrences for a field, any one of the multiple values may be selected as the result value. Similarly, the result values for the other fields/keys are identified by taking the text with the highest count or maximum occurrences.

Text portion 650 depicts a result text generated by text processor 280 by combining the values in text portions 510 through 580. It may be noted that text portion 650 is the result text representing the textual information contained in image document 400. Text portion 650 is sent as a response to the request received from the requesting server system 160. It may be readily observed that text portion 650 is accurate and has the best outcome for all the fields.

Thus, according to several aspects of the present disclosure, a (target) image document is fed into multiple image enhancement pipelines, each pipeline performing a corresponding set of image processing techniques on the target image document to generate corresponding enhanced image documents. Optical character recognition (OCR) is then performed on the enhanced image documents to extract corresponding texts. The corresponding texts are then combined to identify the textual information contained in the target image document. The combining of the texts is performed based on maximum occurrences of each text in the various texts generated based on OCR of the respective enhanced image documents, which in turn is generated as outputs of the multiple image enhancement pipelines.

It should be further appreciated that the features described above can be implemented in various embodiments as a desired combination of one or more of hardware, executable modules, and firmware. The description is continued with respect to an embodiment in which various features are operative when the software instructions described above are executed.

9. Digital Processing System

Figure 7:
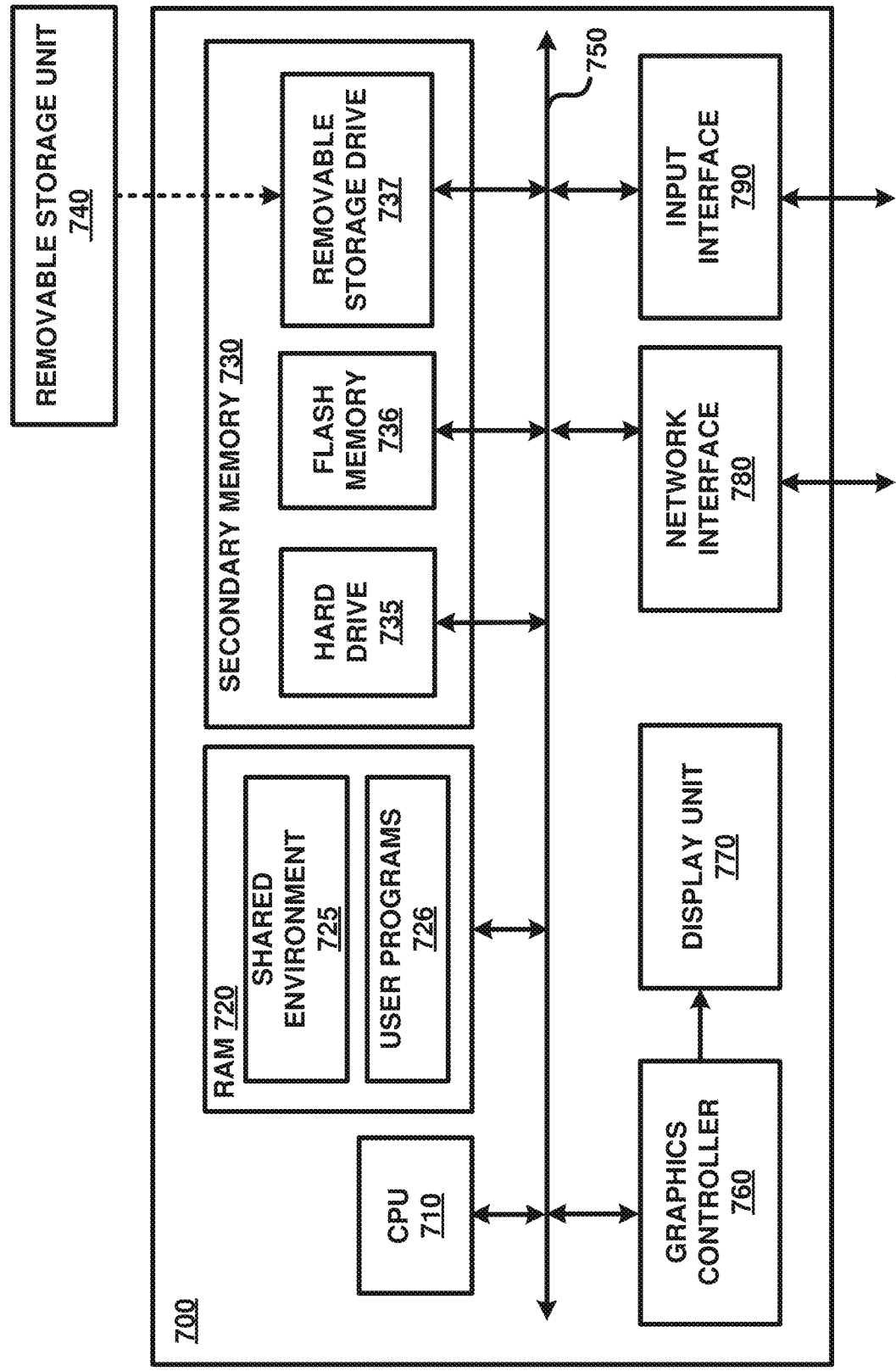
FIG. 7 is a block diagram illustrating the details of a digital processing system in which various aspects of the present disclosure are operative by execution of appropriate executable modules.

FIG. 7 is a block diagram illustrating the details of digital processing system (800) in which various aspects of the present disclosure are operative by execution of appropriate executable modules. Digital processing system 700 may correspond to text extraction system (TES) 150.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or other user programs 726 (such as other applications, DBMS, etc.). In addition to shared environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems connected to the networks.

Secondary memory 730 may contain hard drive 735, flash memory 736, and removable storage drive 737. Secondary memory 730 may store the data (e.g., data portions of FIGS. 4, 5A-5H and 6) and software instructions (e.g., for implementing the steps of FIG. 2, for implementing the blocks of FIG. 3), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions for extracting textual information from image documents, wherein execution of said one or more instructions by one or more processors contained in a digital processing system cause said digital processing system to perform the actions of:

receiving a request to extract textual information from an image document containing a plurality of fields, each field having a corresponding image portion containing a key portion and a value portion, said image document being encoded according to a set of image document properties;

identifying, at a first time instance, a plurality of image enhancements from a list of image enhancements based on said set of image document properties, wherein said set of image document properties comprises at least one of source machine type generating said image document, a resolution of said image document and a number and types of colors in said image document, wherein each image enhancement comprises a corresponding sequence of image processing techniques, wherein each sequence of image processing techniques comprises two or more of Denoising, Blurring, Grayscaling, Sharpening, Binarization, Contrasting, Enhancing, Brightening, Shadow Removal, Dilation, Erosion and Blurring;

performing, after said first time instance, character recognition based on images of said image document using a plurality of approaches executed independently, wherein each approach of said plurality of approaches comprises applying a corresponding image enhancement of said plurality of image enhancements, wherein applying an image enhancement comprises applying in series the corresponding sequence of image processing techniques of the image enhancement, wherein character recognition using each approach generates a corresponding recognized text for each field, the recognized text containing a key and a value respectively representing text in the key portion and the value portion of the field, each value comprising a plurality of characters, wherein a respective plurality of values are generated for each field of the plurality of fields, wherein each value of said respective plurality of values is generated for the field by said performing character recognition using a corresponding approach of said plurality of approaches;

for each field of said plurality of fields, selecting one value of said respective plurality of values for the field as representing a recognized best value for the field, wherein said selecting selects a first value generated by a first sequence of image processing techniques as the recognized best value for a first field and a second value generated by a second sequence of image processing techniques as the recognized best value for a second field, wherein said first field and said field are comprised in said plurality of fields;

combining the respective recognized best value and said key for each field of said plurality of fields to form a result text representing the textual information contained in said image document; and providing said result text as a response to said request.

2. The non-transitory machine-readable medium of claim 1, wherein each approach of said plurality of approaches is executed in parallel using a corresponding thread of a plurality of threads, wherein said performing using said plurality of approaches comprises:

applying said plurality of approaches to generate a plurality of enhanced image documents; and determining using character recognition, said corresponding recognized text from a corresponding enhanced image document of said plurality of enhanced image documents.

3. The non-transitory machine-readable medium of claim 2, wherein said determining comprises one or more instructions for:

converting, using character recognition, said plurality of enhanced image documents to a corresponding plurality of textual representations; and applying a set of regular expressions to identify said corresponding recognized text from said plurality of textual representations.

4. The non-transitory machine-readable medium of claim 2, further comprising one or more instructions for pre-processing prior to said performing, said image document to generate a processed image document, wherein said pre-processing comprises image resealing, image skew correction and background cropping, wherein said generating applies said plurality of image enhancements on said processed image document.

5. The non-transitory machine-readable medium of claim 2, wherein said selecting selects for each field, the value having the maximum occurrences among the values generated for the field as the recognized best value for the field.

6. The non-transitory machine-readable medium of claim 1, wherein said identifying comprises:

maintaining an ensemble data specifying said list of image enhancements; and selecting in response to said request, based on said set of image document properties, said plurality of image enhancements from said list of image enhancements specified in said ensemble data;

wherein said set of image document properties comprises all of said source machine type generating said image document, said resolution of said image document and said number and types of colors in said image document.

7. The non-transitory machine-readable medium of claim 1, wherein said character recognition comprises optical character recognition (OCR), wherein the corresponding plurality of image processing techniques for a first image enhancement comprise Denoising, Blurring, Grayscaling, wherein the corresponding plurality of image processing techniques for a second image enhancement comprise Denoising, Sharpening, Binarization, wherein the corresponding plurality of image processing techniques for a third image enhancement comprise Contrasting, Enhancing, wherein the corresponding plurality of image processing techniques for a fourth image enhancement comprise Brightening, Grayscaling, wherein the corresponding plurality of image processing techniques for a fifth image enhancement comprise Shadow Removal, Denoising, wherein the corresponding plurality of image processing techniques for a sixth image enhancement comprise Sharpening, Brightening, Binarization, wherein the corresponding plurality of image processing techniques for a seventh image enhancement comprise Dilation, Erosion, Denoising, Grayscaling, wherein the corresponding plurality of image processing techniques for a eighth image enhancement comprise Blurring, Shadow Removal, Binarization, wherein said first image enhancement, said second image enhancement, said third image enhancement, said fourth image enhancement, said fifth image enhancement, said sixth image enhancement, said seventh image enhancement, and said eighth image enhancement are comprised in said plurality of image enhancements.

8. A computer implemented method for extracting textual information from image documents, said method comprising:

receiving a request to extract textual information from an image document containing a plurality of fields, each field having a corresponding image portion containing a key portion and a value portion, said image document being encoded according to a set of image document properties;

identifying, at a first time instance, a plurality of image enhancements from a list of image enhancements based on said set of image document properties, wherein said set of image document properties comprises at least one of source machine type generating said image document, a resolution of said image document and a number and types of colors in said image document, wherein each image enhancement comprises a corresponding sequence of image processing techniques, wherein each sequence of image processing techniques comprises two or more of Denoising, Blurring, Grayscaling, Sharpening, Binarization, Contrasting, Enhancing, Brightening, Shadow Removal, Dilation, Erosion and Blurring;

performing, after said first time instance, character recognition based on images of said image document using a plurality of approaches executed independently, wherein each approach of said plurality of approaches comprises applying a corresponding image enhancement of said plurality of image enhancements, wherein applying an image enhancement comprises applying in series the corresponding sequence of image processing techniques of the image enhancement, wherein character recognition using each approach generates a corresponding recognized text for each field, the recognized text containing a key and a value respectively representing text in the key portion and the value portion of the field, each value comprising a plurality of characters, wherein a respective plurality of values are generated for each field of the plurality of fields, wherein each value of said respective plurality of values is generated for the field by said performing character recognition using a corresponding approach of said plurality of approaches;

for each field of said plurality of fields, selecting one value of said respective plurality of values for the field as representing a recognized best value for the field, wherein said selecting selects a first value generated by a first sequence of image processing techniques as the recognized best value for a first field and a second value generated by a second sequence of image processing techniques as the recognized best value for a second field, wherein said first field and said field are comprised in said plurality of fields;

combining the respective recognized best value and said key for each field of said plurality of fields to form a result text representing the textual information contained in said image document; and providing said result text as a response to said request.

9. The method of claim 8, wherein each approach of said plurality of approaches is executed in parallel using a corresponding thread of a plurality of threads, wherein said performing using said plurality of approaches comprises:

applying said plurality of approaches to generate a plurality of enhanced image documents; and determining using character recognition, said corresponding recognized text from a corresponding enhanced image document of said plurality of enhanced image documents.

10. The method of claim 9, wherein said determining comprises:
converting, using character recognition, said plurality of enhanced image documents to a corresponding plurality of textual representations; and
applying a set of regular expressions to identify said corresponding recognized text from said plurality of textual representations.

11. The method of claim 9, further comprising pre-processing prior to said performing, said image document to generate a processed image document, wherein said pre-processing comprises image resealing, image skew correction and background cropping,
wherein said generating applies said plurality of image enhancements on said processed image document.

12. The method of claim 9, wherein said selecting selects for each field, the value having the maximum occurrences among the values generated for the field as the recognized best value for the field.

13. The method of claim 8, wherein said identifying comprises:
maintaining an ensemble data specifying said list of image enhancements; and
selecting in response to said request, based on said set of image document properties, said plurality of image enhancements from said list of image enhancements specified in said ensemble data;
wherein said set of image document properties comprises all of said source machine type generating said image document, said resolution of said image document and said number and types of colors in said image document.

14. The method of claim 8, wherein said character recognition comprises optical character recognition (OCR),
wherein the corresponding plurality of image processing techniques for a first image enhancement comprise Denoising, Blurring, Grayscaling,
wherein the corresponding plurality of image processing techniques for a second image enhancement comprise Denoising, Sharpening, Binarization,
wherein the corresponding plurality of image processing techniques for a third image enhancement comprise Contrasting, Enhancing,
wherein the corresponding plurality of image processing techniques for a fourth image enhancement comprise Brightening, Grayscaling,
wherein the corresponding plurality of image processing techniques for a fifth image enhancement comprise Shadow Removal, Denoising,
wherein the corresponding plurality of image processing techniques for a sixth image enhancement comprise Sharpening, Brightening, Binarization,
wherein the corresponding plurality of image processing techniques for a seventh image enhancement comprise Dilation, Erosion, Denoising, Grayscaling,
wherein the corresponding plurality of image processing techniques for a eighth image enhancement comprise Blurring, Shadow Removal, Binarization,
wherein said first image enhancement, said second image enhancement, said third image enhancement, said fourth image enhancement, said fifth image enhancement, said sixth image enhancement, said seventh image enhancement, and said eighth image enhancement are comprised in said plurality of image enhancements.

15. A digital processing system comprising:
a random access memory (RANI) to store instructions for extracting textual information from image documents; and
one or more processors to retrieve and execute the instructions, wherein execution of the instructions causes the digital processing system to perform the actions of:
receiving a request to extract textual information from an image document containing a plurality of fields, each field having a corresponding image portion containing a key portion and a value portion, said image document being encoded according to a set of image document properties;
identifying, at a first time instance, a plurality of image enhancements from a list of image enhancements based on said set of image document properties,
wherein said set of image document properties comprises at least one of source machine type generating said image document, a resolution of said image document and a number and types of colors in said image document,
wherein each image enhancement comprises a corresponding sequence of image processing techniques, wherein each sequence of image processing techniques comprises two or more of Denoising, Blurring, Grayscaling, Sharpening, Binarization, Contrasting, Enhancing, Brightening, Shadow Removal, Dilation, Erosion and Blurring;
performing, after said first time instance, character recognition based on images of said image document using a plurality of approaches executed independently, wherein each approach of said plurality of approaches comprises applying a corresponding image enhancement of said plurality of image enhancements, wherein applying an image enhancement comprises applying in series the corresponding sequence of image processing techniques of the image enhancement,
wherein character recognition using each approach generates a corresponding recognized text for each field, the recognized text containing a key and a value respectively representing text in the key portion and the value portion of the field, each value comprising a plurality of characters,
wherein a respective plurality of values are generated for each field of the plurality of fields, wherein each value of said respective plurality of values is generated for the field by said performing character recognition using a corresponding approach of said plurality of approaches;
for each field of said plurality of fields, selecting one value of said respective plurality of values for the field as representing a recognized best value for the field, wherein said selecting selects a first value generated by a first sequence of image processing techniques as the recognized best value for a first field and a second value generated by a second sequence of image processing techniques as the recognized best value for a second field, wherein said first field and said field are comprised in said plurality of fields;
combining the respective recognized best value and said key for each field of said plurality of fields to form a result text representing the textual information contained in said image document; and providing said result text as a response to said request.

16. The digital processing system of claim 15, wherein each approach of said plurality of approaches is executed in parallel using a corresponding thread of a plurality of threads, wherein said performing using said plurality of approaches comprises:

applying said plurality of approaches to generate a plurality of enhanced image documents; and determining using character recognition, said corresponding recognized text from a corresponding enhanced image document of said plurality of enhanced image documents.

17. The digital processing system of claim 16, wherein for said determining, said digital processing system performs the actions of:

converting, using character recognition, said plurality of enhanced image documents to a corresponding plurality of textual representations; and applying a set of regular expressions to identify said corresponding recognized text from said plurality of textual representations.

18. The digital processing system of claim 16, further performing the actions of pre-processing prior to said performing, said image document to generate a processed image document, wherein said pre-processing comprises image resealing, image skew correction and background cropping, wherein said digital processing system applies said plurality of image enhancements on said processed image document.

19. The digital processing system of claim 16, wherein said selecting selects for each field, the value having the maximum occurrences among the values generated for the field as the recognized best value for the field.

20. The digital processing system of claim 15, wherein said identifying comprises:

maintaining an ensemble data specifying said list of image enhancements; and selecting in response to said request, based on said set of image document properties, said plurality of image enhancements from said list of image enhancements specified in said ensemble data;

wherein said set of image document properties comprises all of said source machine type generating said image document, said resolution of said image document and said number and types of colors in said image document.

* * * * *